(12) United States Patent
Belleau

(10) Patent No.: US 8,702,112 B1
(45) Date of Patent: Apr. 22, 2014

(54) STEERING LINKAGE AND METHOD FOR PRODUCING SAME

(75) Inventor: Ryan Mark Belleau, St. Catharines (CA)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/468,257

(22) Filed: May 10, 2012

Related U.S. Application Data

(60) Provisional application No. 61/484,336, filed on May 10, 2011.

(51) Int. Cl.
*B62D 7/16* (2006.01)

(52) U.S. Cl.
USPC ................. 280/93.51; 280/89.12; 403/306

(58) Field of Classification Search
USPC ........ 280/93.51, 89.12; 403/2, 14, 46, 48, 77, 403/290, 306
See application file for complete search history.

(56) References Cited

U.S. PATENT DOCUMENTS

| | | | | |
|---|---|---|---|---|
| 2,757,028 A | * | 7/1956 | Latzen | 403/203 |
| 3,583,052 A | * | 6/1971 | Herbenar | 29/896.7 |
| 3,962,931 A | * | 6/1976 | Moneta | 74/493 |
| 5,044,808 A | * | 9/1991 | Busse | 403/2 |
| 5,104,136 A | * | 4/1992 | Buhl et al. | 280/93.5 |
| 5,429,447 A | * | 7/1995 | Wood | 403/46 |
| 5,560,257 A | * | 10/1996 | DeBisschop et al. | 74/492 |
| 6,038,771 A | * | 3/2000 | Takehara et al. | 29/897.2 |
| 6,086,075 A | * | 7/2000 | O'Bryan et al. | 280/89.12 |
| 7,182,544 B2 | * | 2/2007 | Irrer | 403/43 |
| 7,475,908 B2 | * | 1/2009 | Senn | 280/775 |
| 7,547,028 B1 | | 6/2009 | Blaszynski et al. | |

* cited by examiner

*Primary Examiner* — Toan To
*Assistant Examiner* — Darlene P Condra
(74) *Attorney, Agent, or Firm* — MacMillan, Sobanski & Todd, LLC

(57) ABSTRACT

An improved structure for a steering linkage adapted for use in a vehicle steering system and method for producing the same. According to one embodiment, the steering linkage comprises a first member and a second member disposed at least partially within the first member and operatively secured together by at least a mechanical type of connection. The second member includes a stop feature provided therein which is configured such that in the event the point of connection between the first member and the second member is disrupted, the stop feature is operative to prevent the first member and the second member from completely separating from each other so that at least a portion of the second member remains within the first member so as to operatively couple the first and second members together.

19 Claims, 6 Drawing Sheets

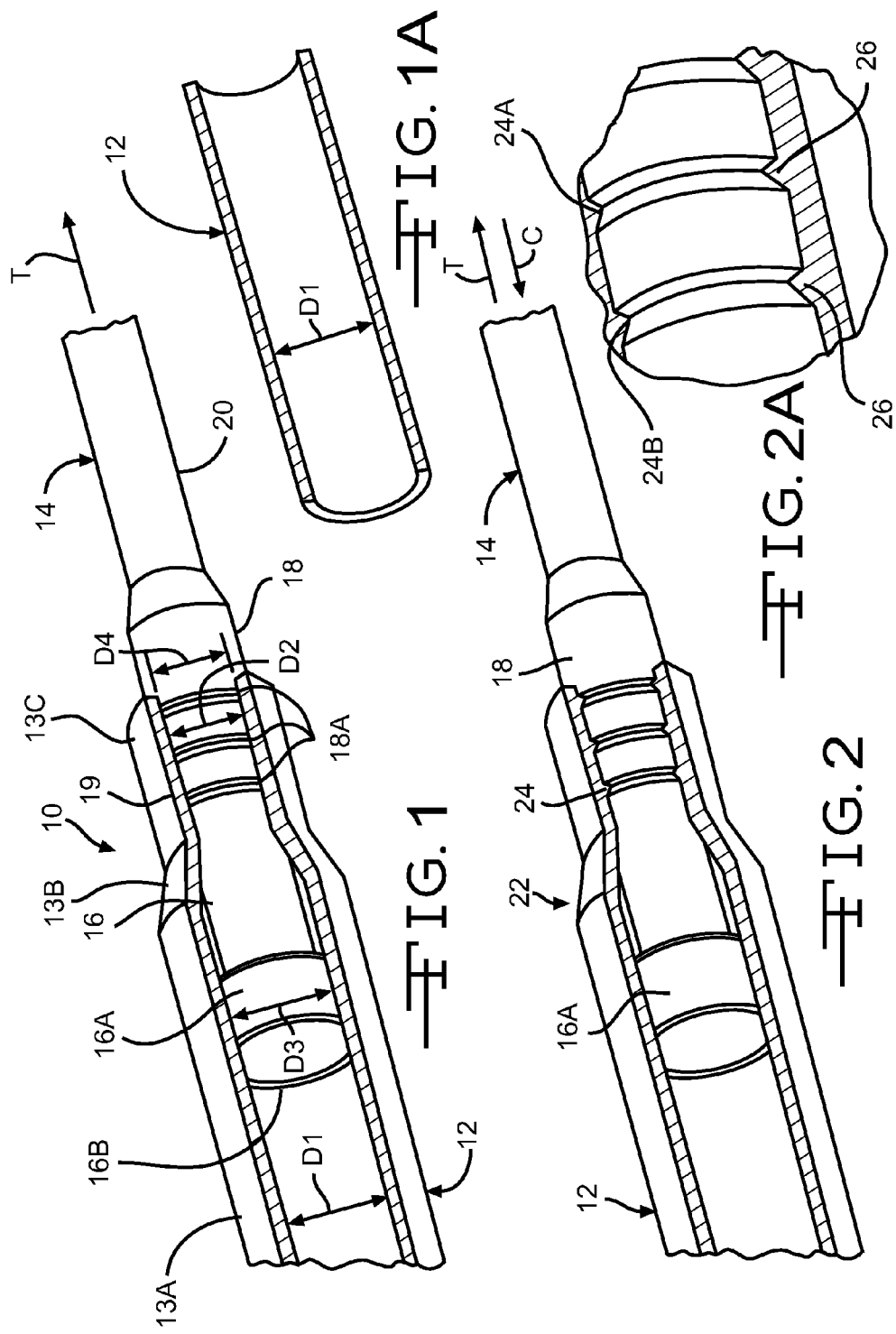

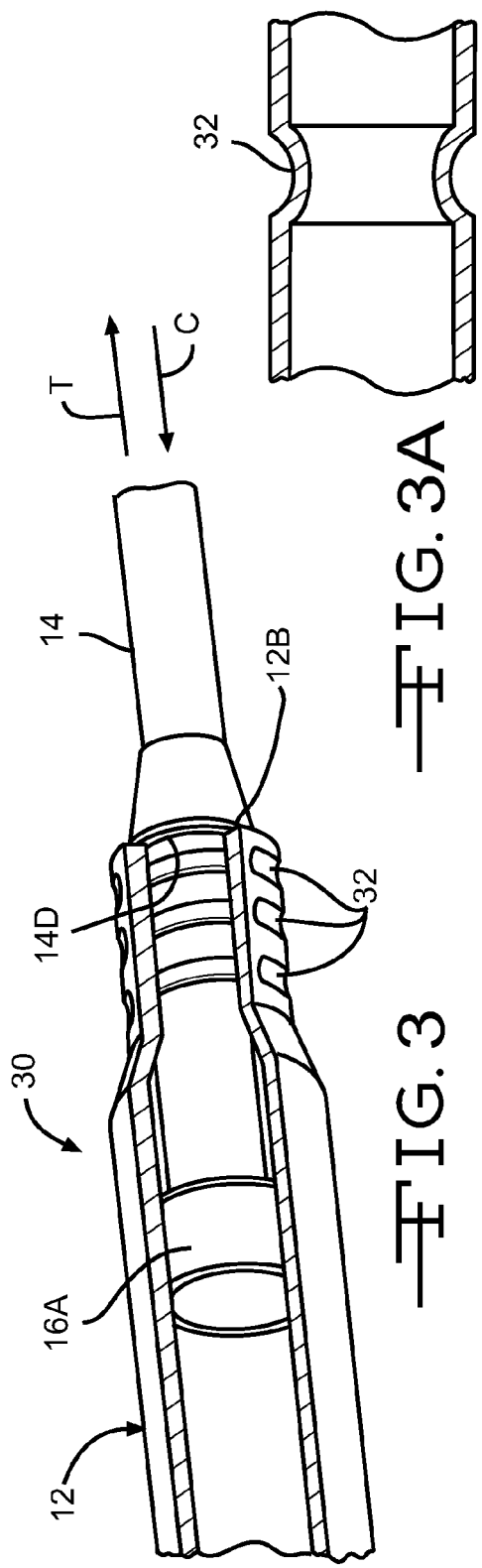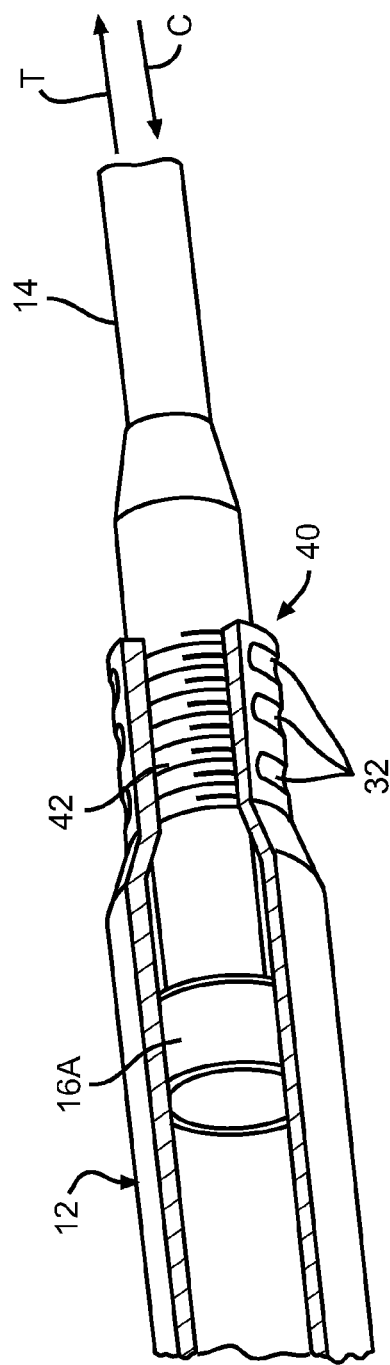

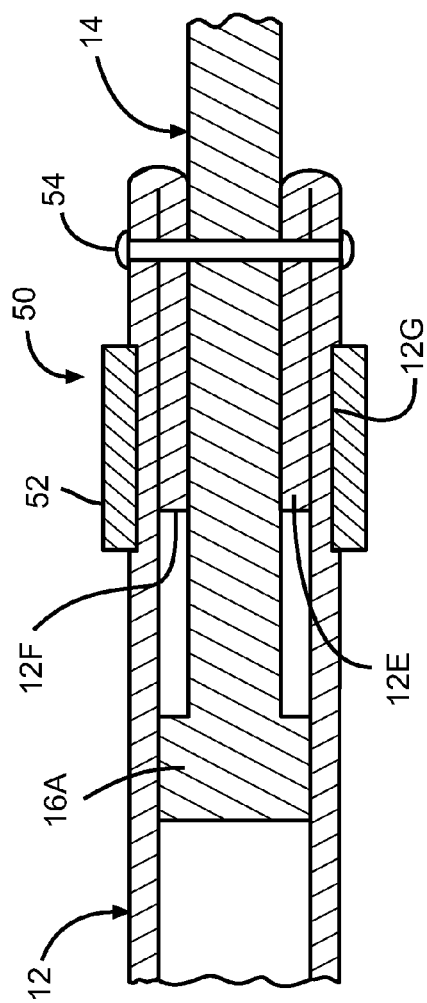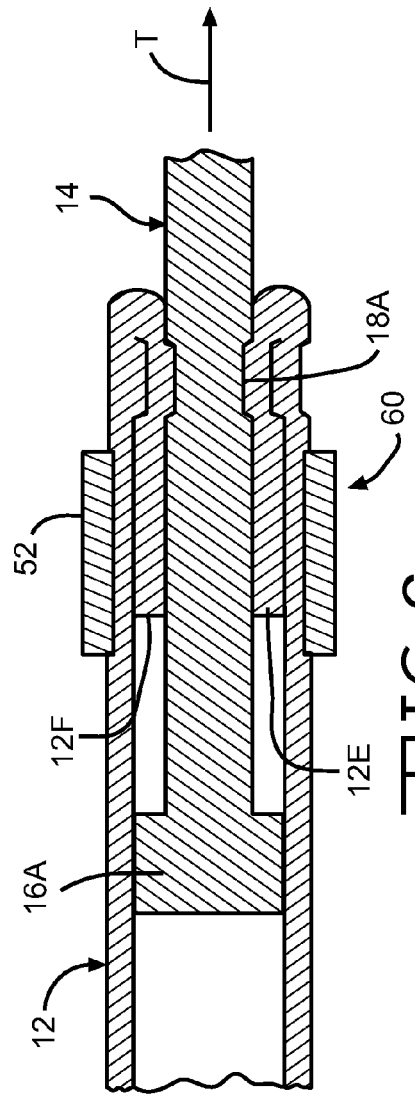

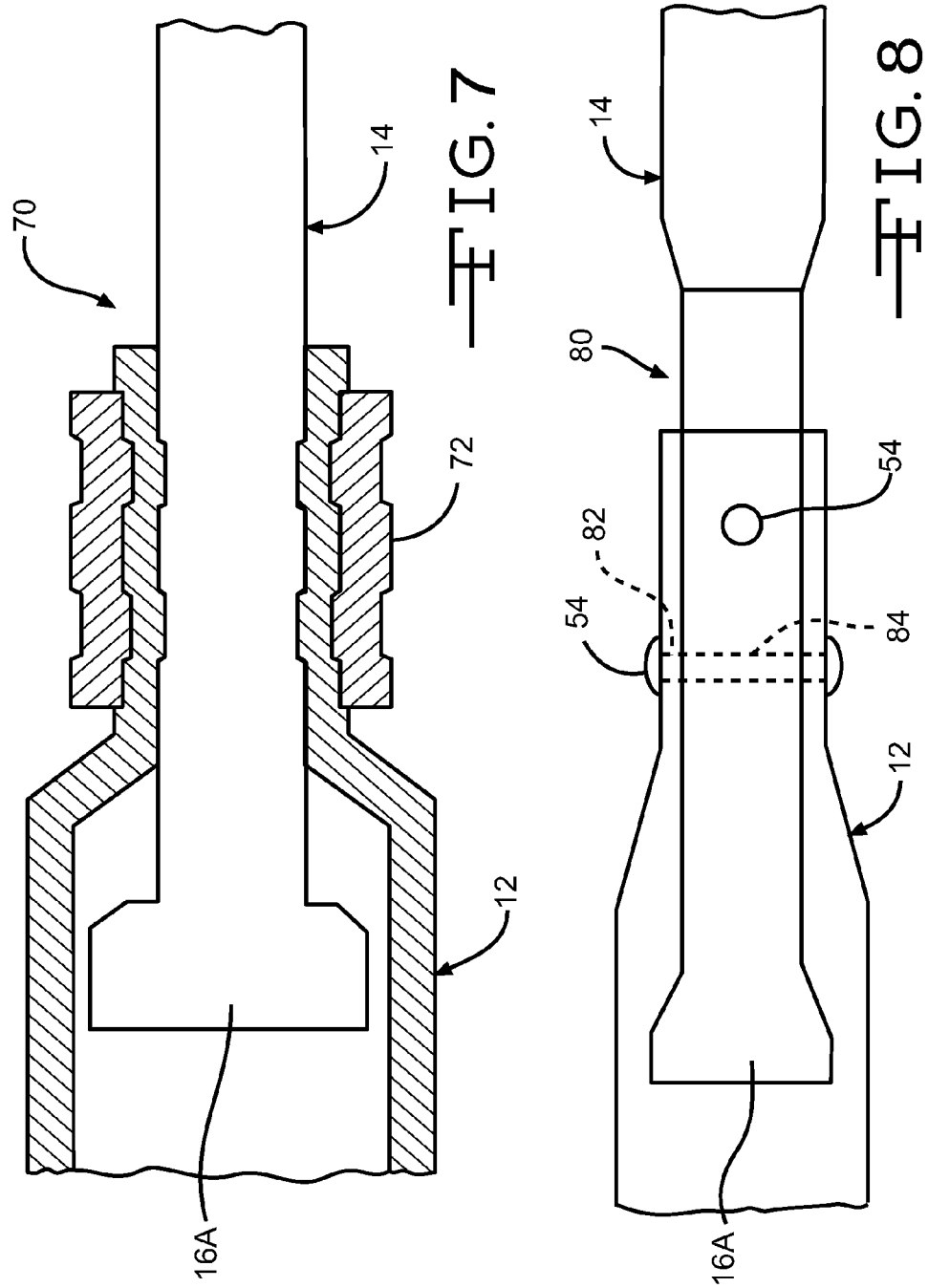

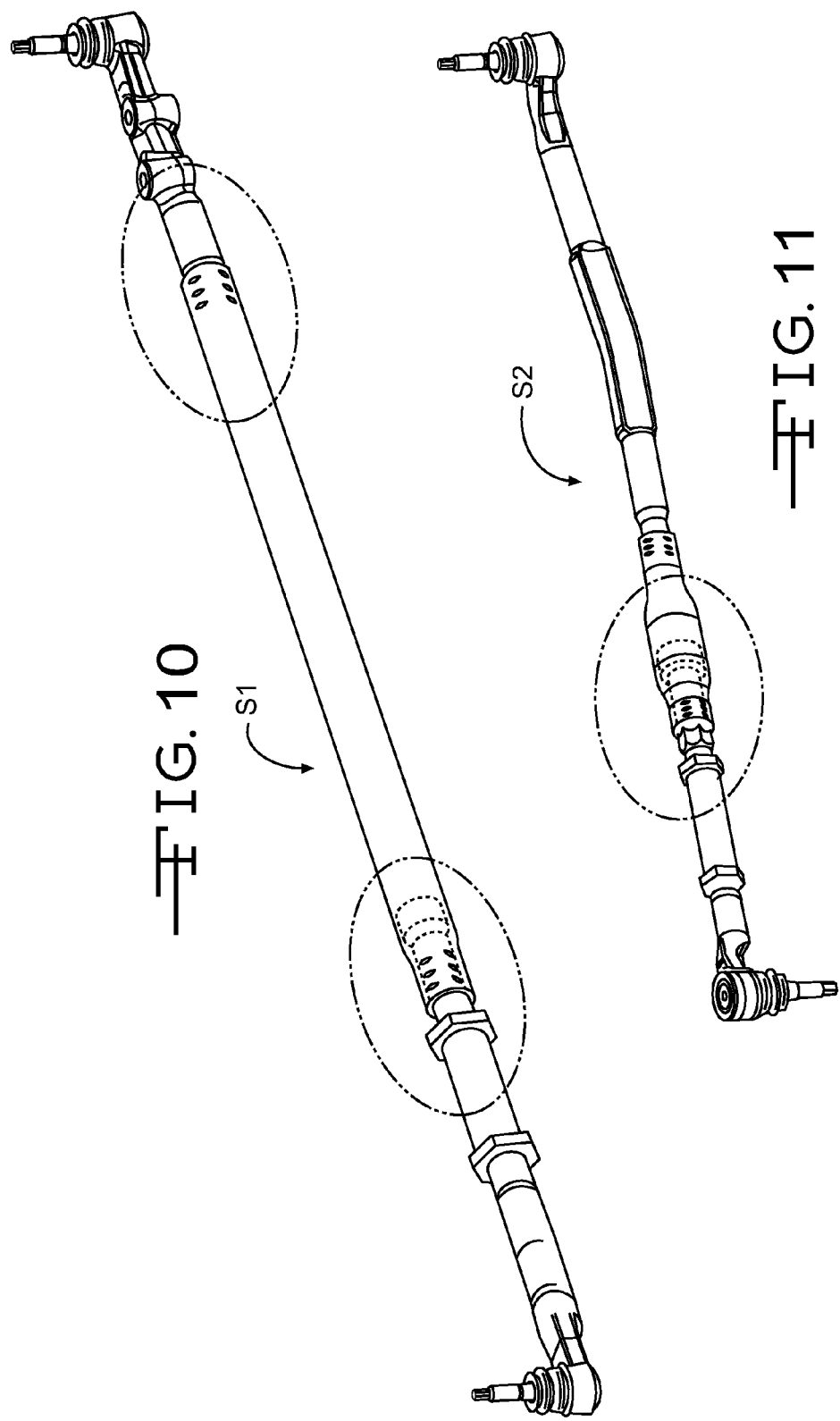

US 8,702,112 B1

STEERING LINKAGE AND METHOD FOR PRODUCING SAME

CROSS-REFERENCE TO RELATED APPLICATIONS

This application claims the benefit of U.S. Provisional Application Ser. No. 61/484,336, filed May 10, 2011, the disclosure of this application incorporated herein by reference in entirety.

BACKGROUND OF THE INVENTION

This invention relates in general to vehicle steering systems and in particular to an improved steering linkage for use in such vehicle steering systems and method for producing the same.

Automotive vehicle steering and suspension systems are well known and are used to steer the front wheels as well as support the vehicle while providing a smooth ride. Typically, a steering linkage of the steering system includes a tie rod assembly (also sometimes called a drag link assembly, depending upon the particular steering linkage configuration) . Such a steering system having a steering linkage tie rod assembly is disclosed in U.S. Pat. No. 7,547,028 B1 to Blaszynski et al., the disclosure of this patent incorporated by reference herein in entirety.

SUMMARY OF THE INVENTION

This invention relates to an improved steering linkage for use in a vehicle steering system and method for producing the same According to one embodiment, a steering linkage adapted for use in a vehicle steering system comprises: a first member and a second member disposed at least partially within the first member and operatively secured together by at least a mechanical type of connection; wherein the second member includes a stop feature provided therein which is configured such that in the event the connection between the first member and the second member is disrupted, the stop feature is operative to prevent the first member and the second member from completely separating from each other so that at least a portion of the second member remains within the first member so as to operatively couple the first and second members together.

According to another embodiment, the first member and the second member are secured together by one of or a combination of two or more of swaging, staking, soldering, pinning and barbing.

According to another embodiment, the second member stop feature includes an enlarged portion provided thereon which is spaced apart from the region of the connection between the first and second members.

According to another embodiment, the first member is a hollow tubular member having a reduced diameter end, the second member is a tubular member having a stepped body defining at least a first tube outer diameter and a second tube outer diameter which is less than the first tube outer diameter, wherein at least a portion of the second tube outer diameter is disposed within the reduced diameter end of the first member and secured thereto, and wherein the first outer tube diameter defines the stop feature of the second member.

According to another embodiment, an outer clamp member is further provided and is disposed about the first member.

According to another embodiment, the second member is a tubular member having a stepped body defining at least a first tube outer diameter and a second tube outer diameter which is less than the first tube outer diameter, and wherein the first outer tube diameter defines the stop feature of the second member.

According to another embodiment, the second tube outer diameter of the second member includes at least one groove formed therein.

According to another embodiment, the first member includes at least one barb provided therein which is configured to be disposed in the at least one groove of the second tube member.

According to another embodiment, the solder is disposed in the at least one groove and is configured to at least partially assist in the connection of the first member to the second member.

According to another embodiment, the second member further includes a shoulder provided thereon, the shoulder being located outside of the first member and adjacent to an opened end thereof.

According to another embodiment, the first member includes a double wall at the connection to the second member.

According to another embodiment, a steering linkage adapted for use in a vehicle steering system comprises: a generally tubular first member having a stepped body configuration having at least a first body portion and a second body portion, the first body portion defines a first tube inner diameter and the second body portion defines a second tube inner diameter which is less than the first tube inner diameter; and a generally tubular second member having a stepped body configuration having at least a first body portion and a second body portion, the first body portion defines a first tube outer diameter and the second body portion defines a second tube outer diameter which is less than the first outer diameter; wherein the first tube outer diameter of the second member is equal to or less than the first tube inner diameter of the first member, the second tube outer diameter of the second member is equal to or less than the second tube inner diameter of the first member, and wherein the first tube outer diameter of the second member is greater than the second tube inner diameter of the first member; wherein the second member is disposed within the first member with the first body portion of the first member disposed around the first body portion of the second member and the second body portion of the first member disposed around the second body portion of the second member; wherein the first member is secured to the second member by at least a mechanical type of connection defined at the second body portions of the first and second members; and wherein the first body portion of the second member is spaced from the connection such that upon a disruption of the connection the second member will not completely separate from within the first member but still remain therein and operatively coupled together due to the first tube outer diameter of the second member being greater than the second tube inner diameter of the first member.

According to another embodiment, a method for producing a steering linkage adapted for use in a vehicle steering system comprises the steps of: providing a first member; providing a second member; disposing at least a portion of the second member within the first member; and securing the first member and the second member together by at least a mechanical type of connection; wherein the second member includes a stop feature provided therein which is configured such that in the event the connection between the first member and the second member is disrupted, the stop feature is operative to prevent the first member and the second member from completely separating from each other so that at least a portion of the second member remains within the first member so as to operatively couple the first and second members together.

According to another embodiment, the step of securing includes securing the first member and the second member together such that the connection is designed to disrupt at a predetermined load.

Other advantages of this invention will become apparent to those skilled in the art from the following detailed description of the preferred embodiments, when read in light of the accompanying drawings.

BRIEF DESCRIPTION OF THE DRAWINGS

FIG. 1 is a perspective view of a first embodiment of an improved steering linkage in accordance with the present invention.

FIG. 1A is a perspective view of a selected component of the first embodiment of the steering linkage shown in FIG. 1 prior to assembly.

FIG. 2 is a perspective view of a second embodiment of an improved steering linkage in accordance with the present invention.

FIG. 2A is an enlarged view of a portion of FIG. 2.

FIG. 3 is a perspective view of a third embodiment of an improved steering linkage in accordance with the present invention.

FIG. 3A is an enlarged view of a portion of FIG. 3.

FIG. 4 is a perspective view of a fourth embodiment of an improved steering linkage in accordance with the present invention.

FIG. 5 is a sectional view of a fifth embodiment of an improved steering linkage in accordance with the present invention.

FIG. 6 is a sectional view of a sixth embodiment of an improved steering linkage in accordance with the present invention.

FIG. 7 is a sectional view of a seventh embodiment of an improved steering linkage in accordance with the present invention.

FIG. 8 is a plan view of an eighth embodiment of an improved steering linkage in accordance with the present invention.

FIG. 10 is a perspective view of a portion of a vehicle steering system showing "circled" locations in which the steering linkage of the present invention is configured to be utilized.

FIG. 11 is a perspective view of selected components of another embodiment of a vehicle steering system shown a "circled" location in which the steering linkage of the present invention is configured to be utilized

DETAILED DESCRIPTION OF THE PREFERRED EMBODIMENTS

Figure 9:
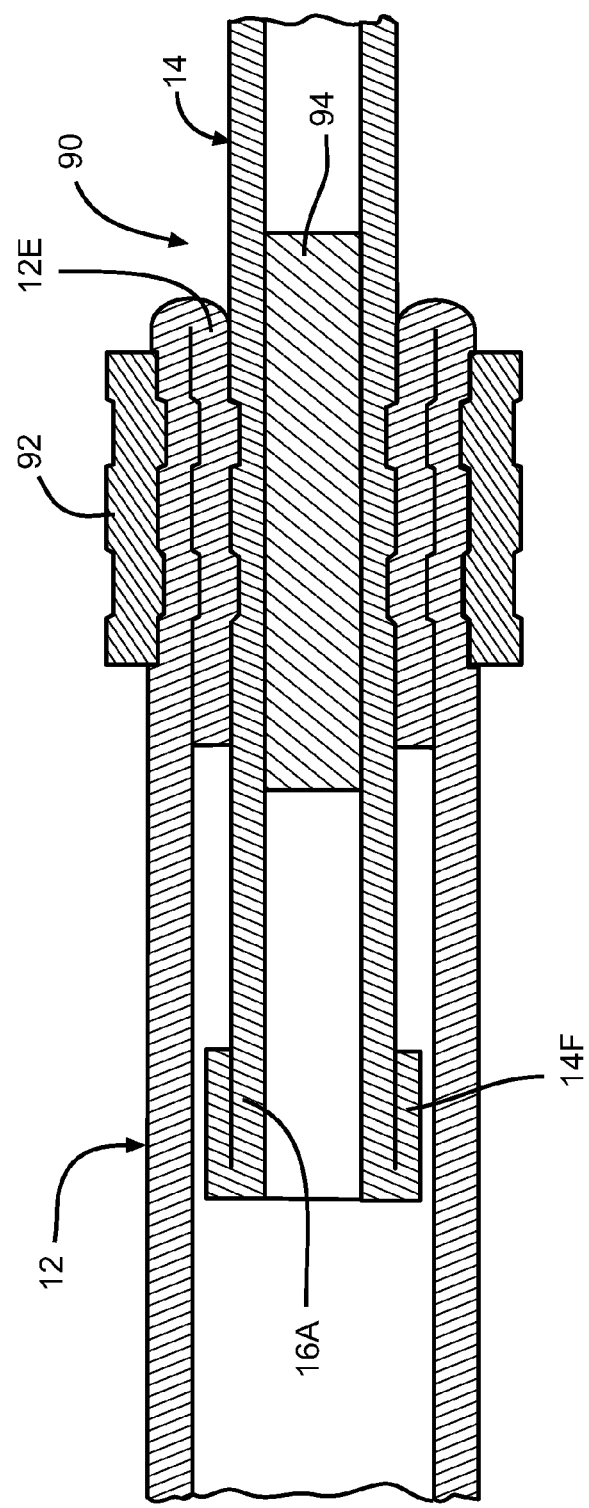
FIG. 9 is a sectional view of a ninth embodiment of an improved steering linkage in accordance with the present invention.

Referring now to FIG. 1, there is illustrated a first embodiment of an improved steering linkage, indicated generally at 10, constructed in accordance with the present invention. The illustrated steering linkage 10 can be configured for use in a vehicle steering system, such as shown generally at S1 in FIG. 10 in connection with a vehicle tie rod assembly or as shown generally at S2 in FIG. 11 in connection with a vehicle drag link assembly. The general structure and operation of the vehicle steering systems S1 and S2 are conventional in the art. Thus, only those portions of the vehicle steering systems S1 and S2 which are necessary for a full understanding of this invention will be explained and illustrated in detail. Also, although the improved steering linkage of this invention will be described and illustrated in connection with the vehicle steering systems S1 and S2 disclosed herein, it will be appreciated that the steering linkage of this invention may be used in connection with other kinds, types or designs of vehicle steering systems if so desired.

In the illustrated embodiment, the steering linkage 10 of the first embodiment includes a first member 12 and a second member 14. In the illustrated embodiment, the first member 12 is illustrated as being preferably an outer tube or hollow tubular member, and the second member 14 is illustrated as being preferably an inner bar or solid tubular member (although the second member 14 can be a hollow tubular member in some design applications if so desired). The first member 12 is formed from a suitable material, such as for example, steel, aluminum or plastic. The second member 14 is formed from a suitable material, such as for example, steel, aluminum or plastic. Preferably, the first member 12 is formed from steel and the second member 14 is formed from steel.

In the illustrated embodiment, the first member 12 (following an assembly process discussed below which is operative to couple or connect it with the second member 14), has a stepped or multiple diameter body having at least a first portion 13A, a "tapered" second transition portion 13B, and a third portion 13C. As can be seen, in this embodiment, the first portion 13A includes an inner surface which defines an inner diameter D1 which is greater than an inner diameter D2 defined by an inner surface of the third portion 13C. As shown in FIG. 1A, prior to the assembly process, the first member 12 is not stepped but rather only has an inner surface which defines the inner diameter D1.

In the illustrated embodiment, the second member 14 has a stepped or multiple diametered body having at least a first "end" portion 16, a second portion 18, and a third portion 20. In this embodiment, the first portion 16 is provided with an "enlarged stop" feature or portion 16A along at least a portion thereof preferably starting at a remote end 16B thereof and extending toward the second portion 18. The enlarged portion 16A is illustrated as being an annular member having an outer diameter D3 which is greater than an outer diameter D4 defined by the second portion 18. Preferably, the outer diameter D3 of the second member 14 is less than the inner diameter D1 of the first member 12, and the outer diameter D4 of the second member 14 is equal to or slightly less than the outer diameter D2 of the first member 12. Alternatively, the outer diameter D3 of the second member 14 can be generally equal to the inner diameter D1 of the first member 12. Also, in the illustrated embodiment, the second portion 18 is preferably provided with one or more annular grooves or recesses 18A provided in an outer surface thereof.

The steering linkage 10 of the first embodiment is preferably assembled in the following manner. The second member 14 is inserted into the first member 12, preferably from the right side in the drawing (but can also be inserted from the left side in the drawing), to a predetermined position therewithin. Following this, the first member 12 is swaged or otherwise formed against the second member 14, (to form the second portion 13B and the third portion 13C as shown in FIG. 1), to thereby "mechanically" couple or secure the first member 12 and the second member 14 together in a mechanical or press-fit type of connection therewith. In addition to this mechanical type connection, during this process, the material of the third portion 13C of the first member 12 can be at least partially displaced or forced into the grooves 18A of the second member 14 to further assist in connecting the first member 12 and the second member 14 together.

Alternatively, in the illustrated embodiment, instead of a swaging process to secure the second member 14 to the first member 12 in situ therewith, the second member 14 can be inserted from the left side in FIG. 1 to a "non-permanent" preassembly position (not shown), so that the first member 12 can be first swaged to the configuration shown in FIG. 1. Following this process, the second member 14 can be pulled (or pushed) by suitable means to the right in the drawing into the previously swaged area and to the assembled position as shown in FIG. 1. This method of assembly can potentially reduce any "natural springback" of the material of the first member 12 which can occur during the insitu swaging process.

Preferably, in the illustrated embodiment a suitable material, such as for example a lead solder material or a brass braze material (shown generally at 19 in FIG. 1), is first deposited into at least some of the grooves 18A of the second member 14 prior to assembly. As a result of this, following the above assembly process a heating process can be performed so that the solder can melt and thereby be utilized to further assist in coupling or securing the first member 12 and the second member 14 together. Preferably, when utilized, the solder 19 can provide the primary means for coupling or securing the member 12 and 14 together and the above-described press-fit can provide the secondary means for coupling the members 12 and 14 together.

In operation, if a vehicle having the first embodiment of the steering linkage 10 installed at one or more places of the vehicle's steering system and the connection between the first member 12 and the second member 14 is disrupted or disconnected at a predetermined load so as to no longer connect the two members 12 and 14 together, the enlarged portion 16A of the first end portion 16 of the second member 14 will engage at least the inner wall surface of the third portion 13C of the first member 12 to thereby effectively retain the second member 14 within the first member 12 and prevent the steering linkage 10 from separating from the vehicle.

In this embodiment, the disconnect between the first member 12 and the second member 14 is preferably primarily based on the surface area of the solder/braze material which is used to join the first member 12 and the second member 14 together and would occur when the steering linkage 10 extends under "high" tensile loading (in the direction of arrow T in FIG. 1). Alternatively, the structure of one or both of the first member 12 and the second member 14 of the first embodiment of the steering linkage 10 and/or the method for securing the first member 12 and the second member 14 together can be other than illustrated and described if so desired.

Referring now to FIG. 2 and using like reference numbers to indicate corresponding parts, there is illustrated a second embodiment of an improved steering linkage, indicated generally at 22, constructed in accordance with the present invention. In this embodiment, grooves 24 provided in the second portion 18 have a uniquely configured shape or geometry which, in conjunction with uniquely shaped members, ribs or barbs 26 provided on an inner wall of the first member 12, allows the barbs 26 to "ride up" an adjacent first tapered or angled surface 24A of the grooves 24 under "high" tensile loading (in the direction of arrow T in FIG. 2), to expand an outer diameter of the adjacent portion of the first member 12. Under compressive loading (in the direction of arrow C in FIG. 2), the members 26 engage an adjacent second flat or parallel surface 24B of the grooves 24 to thereby resist compressive loading thereby allowing the associated steering linkage 10 to preferably have a higher compressive load capability compared to tensile load.

The specific configuration of a preferred one of many possible configurations of the members 26 and the grooves 24 is best shown in the enlarged detail of FIG. 2A. As shown therein, in the illustrated embodiment the grooves 24 are generally chevron-like shaped and are preferably formed therein during the second member 14 forming process, and the members 26 are preferably generally complementarily shaped and include the first tapered or angled surface 26A and the second flat surface 26B and are preferably formed therein during the first member 12 forming process.

Alternatively, the members 26 and/or the grooves 24 can be other than illustrated and described if so desired. For example, the members 26 could have a generally square shape if so desired (not shown). Also, a solder material (not shown) may also be used in this embodiment if so desired. Alternatively, the structure of one or both of the first member 12 and the second member 14 of the second embodiment of the steering linkage 28 and/or the method for securing the first member 12 and the second member 14 together can be other than illustrated and described if so desired.

Referring now to FIG. 3 and using like reference numbers to indicate corresponding or generally similar parts, there is illustrated a third embodiment of an improved steering linkage, indicated generally at 30, constructed in accordance with the present invention. In this embodiment, in addition to a swaging process to secure the first member 12 and the second member 14 together (as described above in connection with first embodiment), an additional metal forming process is preferably also utilized.

Preferably, in this embodiment as best shown in FIG. 3A, a staking process is also used which is operative to deform and push the first member 12 into the second member 14 which also deforms at one or more places as indicated by grooves or depressions 32. Also, in this embodiment the second member 14 is preferably provided with a "butt" or shoulder 14D which is located adjacent to an end 12B of the first member 12.

In the illustrated embodiment, tensile loading (in the direction of arrow T in FIG. 3), releases the swage between the first member 12 and the second member 14 and the disconnect between the first member 12 and the second member 14 is primarily based on the depth and quantity of the stakes 32 during "high" tensile loading. Under compressive loading (in the direction of arrow C in FIG. 3), the butt 14D against the end 12B resists such loading or can have a different loading. Alternatively, the structure of one or both of the first member 12 and the second member 14 of the third embodiment of the steering linkage 30 and/or the method for securing the first member 12 and the second member 14 together can be other than illustrated and described if so desired.

Referring now to FIG. 4 and using like reference numbers to indicate corresponding or generally similar parts, there is illustrated a fourth embodiment of an improved steering linkage, indicated generally at 40, constructed in accordance with the present invention. In this embodiment, in addition to swaging to secure the first member 12 and the second member 14 together (as described above in connection with first embodiment), an additional metal forming process is utilized. Preferably, as shown in FIG. 4, a staking process (as described above in connection with third embodiment), is also used as which is operative to deform and push the first member 12 into the second member 14 which also deforms at one or more places as indicated by grooves or depressions 32.

Also, as discussed above in connection with the first embodiment, instead of swaging the second member 14 to the first member 12 in situ, the second member 14 can be inserted from the left in FIG. 4 to a preassembly position (not shown), so that the first member 12 can be first swaged and then the second member 14 pulled to the right in the drawing into the swage area to the shown assembled position and then the staking process performed. This method of assembly reduces any "natural spring back" of the material of the first member 12 which can occur during the insitu swaging process.

To accomplish this, the second member 14 can be provided with external threads (as shown at 42) or without external threads (not shown) along a portion thereof to enable it to be inserted from the left to the preassembly position and then pulled or pushed back to the right into the swaged reduced portion of the first member 12 to the final installed position as shown in FIG. 4 if not provided with external threads or as shown screwed into the first member 12 if threaded to the final installed position as shown in FIG. 4. In this embodiment, tensile loading (in the direction of arrow T in FIG. 4) or compressive loading (in the direction of arrow C in FIG. 4), releases the swage between the first member 12 and the second member 14 and the disconnect between the first member 12 and the second member 14 is primarily based on the depth and quantity of stakes 32 during "high" tensile or compressive loading. Alternatively, the structure of one or both of the first member 12 and the second member 14 of the fourth embodiment of the steering linkage 40 and/or the method for securing the first member 12 and the second member 14 together can be other than illustrated and described if so desired.

Referring now to FIG. 5 and using like reference numbers to indicate corresponding or generally similar parts, there is illustrated a fifth embodiment of an improved steering linkage, indicated generally at 50, constructed in accordance with the present invention. In this embodiment, the first member 12 preferably includes an folded-in/inverted portion or tubular portion 12E and a "anti-expansion" clamp or collar 52 provided to contain the portion 12E about the second member 14. The portion 12E is preferably formed integral with the first member 12 but can be formed separately therefrom. In the illustrated embodiment, the collar 52 is preferably swaged in situ about the first member 12; however, other methods or processes can be used to secure the collar 52 in place. For example, the first member 12 can be provided with an annular recess or trough 12G for receiving the collar 52.

Also, one or more "shear" pins 54 are preferably provided and extend through associated openings (not shown) provided in the first member 12 and the second member 14 and secured in place by suitable means to secure the first member 12 and the second member 14 together. In this embodiment, "high" tensile and/or compressive loading can shear the shear pin 54 connecting the first member 12 and the second member 14 together. However, the second member 14 is prevented from totally separating from the first member 12 due to the end portion 16A engaging an end 12F of the portion 12E of the first member 12. Alternatively, the structure of one or both of the first member 12 and the second member 14 of the fifth embodiment of the steering linkage 50 and/or the method for securing the first member 12 and the second member 14 together can be other than illustrated and described if so desired.

Referring now to FIG. 6 and using like reference numbers to indicate corresponding or generally similar parts, there is illustrated a sixth embodiment of an improved steering linkage, indicated generally at 60, constructed in accordance with the present invention. In this embodiment, the first member 12 is secured to the second member 14 by preferably a swaging process (or other suitable metal forming process), as shown FIG. 6 in order to secure the first member 12 and the second member 14 together. To accomplish this, in the illustrated embodiment the second member 14 preferably includes one or more grooves 18A provided in an outer surface thereof. During the swaging process, the material of the first member 12 is deformed into the grooves 18A to thereby secure the first member 12 and the second member 14 together.

In this embodiment, "high" tensile and/or compressive loading can cause the swaged connection area to loosen allowing relative movement between the first member 12 and the second member 14. However, the second member 14 is prevented from totally separating from the first member 12 due to the end portion 16A engaging the end 12F of the portion 12E of the first member 12. Alternatively, the structure of one or both of the first member 12 and the second member 14 of the sixth embodiment of the steering linkage 60 and/or the method for securing the first member 12 and the second member 14 together can be other than illustrated and described if so desired.

Referring now to FIG. 7 and using like reference numbers to indicate corresponding or generally similar parts, there is illustrated a seventh embodiment of an improved steering linkage, indicated generally at 70, constructed in accordance with the present invention. This embodiment is generally somewhat similar to the second embodiment of the steering linkage 20 shown in FIG. 2 except that in this embodiment a preferably swaged insitu "outer" collar or clamp member 72 has been added about the "inner" swaged point of connection of the first member 12 to the second member 14. Alternatively, the structure of one or both of the first member 12 and the second member 14 of the seventh embodiment of the steering linkage 70 and/or the method for securing the first member 12 and the second member 14 together can be other than illustrated and described if so desired.

Referring now to FIG. 8 and using like reference numbers to indicate corresponding or generally similar parts, there is illustrated a seventh embodiment of an improved steering linkage, indicated generally at 80, constructed in accordance with the present invention. This embodiment is generally similar to the first embodiment of the steering linkage 10 shown in FIG. 1 except that instead of second member 14 having grooves 18A and solder 19 being used like in the steering linkage 10, in this embodiment one or more shear pins 54 are provided. The shear pins 54 extend through associated openings 82 and 84 (shown in phantom in FIG. 8), which are provided in the first member 12 and the second member 14, respectively, to thereby join them together. The particular size, quantity and position of the shear pin or pins 54 can be utilized to control the disengagement between the first and second members. Alternatively, the structure of one or both of the first member 12 and the second member 14 of the eighth embodiment of the steering linkage 80 and/or the method for securing the first member 12 and the second member 14 together can be other than illustrated and described if so desired.

Referring now to FIG. 9 and using like reference numbers to indicate corresponding or generally similar parts, there is illustrated a ninth embodiment of an improved steering linkage, indicated generally at 90, constructed in accordance with the present invention. This embodiment is generally somewhat similar to the sixth and seventh embodiments of the steering linkages 60 and 70 shown in FIGS. 6 and 7, respectively. As shown therein, this embodiment includes: (1) a swaged insitu "outer" collar or clamp member 92 has been added about the "inner" swaged point of connection of the first member 12 to the second member 14; (2) the second member 14 is hollow and includes a folded-in or inverted end 14F which is effective to define the enlarged stop feature or portion 16A; and (3) a third member 94 in disposed within at least a portion of the hollow second member 14. Also, in this embodiment the end 14F of the second member 14 is spaced from an adjacent inner surface of the first member 12. Alternatively, the structure of one or both of the first member 12 and the second member 14 of the ninth embodiment of the steering linkage 90 and/or the method for securing the first member 12 and the second member 14 together can be other than illustrated and described if so desired.

One potential advantage of the embodiments of the present invention is that in the event of a damaging event to the steering linkage of the vehicle's steering system, i.e., such as can occur when the vehicle and/or associated vehicle wheel strikes a curb or a large rock or a similar object, so as to cause a tensile (or compression) failure mode of the associated steering linkage, the steering linkage members 12 and 14 of the present invention will not become totally disconnected or separated from one another at a predetermined load but will remain coupled together or intact (due to the enlarged stop feature preventing a complete decoupling of the members), so that a driver could maintain some form of steering control of the vehicle.

Another potential advantage of the present invention is that the second member 14 can be secured to or fixed to the first member 12 using a variety of mechanical type connections, methods or processes, singularly or in combination, such as for example, swaging, staking, soldering, pinning and barbed. Also, the steering linkage of the present invention can be designed to fail in tensile loading at predetermined loads dependent upon the particular attachment method(s), size(s) and/or surface area of the connection or securement area. The method for controlling such failure is sheer of the staking, solder and/or rib or barb features. Also, the steering linkage of the present invention can be designed to accommodate a bidirectional failure (tensile or compressive), or a directional tensile failure.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A steering linkage adapted for use in a vehicle steering system comprising:
    a first member and a second member disposed at least partially within the first member and operatively secured together by at least a mechanical point of connection;
    wherein the second member includes a stop feature provided thereon at a remote end thereof which is separate and distinct from the mechanical point of connection, wherein the first member is a hollow tubular member having a reduced diameter end, the second member is a tubular member having a stepped body defining at least a first tube outer diameter and a second tube outer diameter which is less than the first tube outer diameter, wherein at least a portion of the second tube outer diameter is disposed within the reduced diameter end of the first member and is secured thereto by the mechanical point of connection, and wherein the first outer tube diameter defines the stop feature of the second member and the first tube outer diameter is greater than the reduced diameter end of the first member, wherein the stop feature is configured such that in the event the mechanical point of connection between the first member and the second member is disrupted, the stop feature is operative to prevent the first member and the second member from completely separating from each other by the stop feature not being capable of passing through the reduced diameter end of the first member so that at least the stop feature of the second member remains within the first member so as to operatively couple the first and second members together.

2. The steering linkage of claim 1 wherein the first member and the second member are secured together by one of or a combination of two or more of swaging, staking, soldering, pinning and barbing.

3. The steering linkage of claim 1 wherein the second member stop feature is spaced apart from the region of the mechanical point of connection between the first and second members.

4. The steering linkage of claim 1 wherein an outer clamp member is further provided and is disposed about the first member.

5. The steering linkage of claim 1 wherein the second tube outer diameter of the second member includes at least one groove formed therein.

6. The steering linkage of claim 5 wherein the first member includes at least one barb provided therein which is configured to be disposed in the at least one groove of the second tube member.

7. The steering linkage of claim 5 wherein solder is disposed in the at least one groove and is configured to at least partially assist in the connection of the first member to the second member.

8. The steering linkage of claim 1 wherein the second member further includes a shoulder provided thereon, the shoulder being located outside of the first member and adjacent to an opened end thereof.

9. The steering linkage of claim 1 wherein the first member includes a double wall at the point of connection to the second member.

10. A steering linkage adapted for use in a vehicle steering system comprising:
    a generally tubular first member having a stepped body configuration having at least a first body portion and a second body portion, the first body portion defines a first tube first inner diameter and the second body portion defines a first tube second inner diameter which is less than the first tube first inner diameter; and
    a generally tubular second member having a stepped body configuration having at least a first body portion and a second body portion, the first body portion defines a second tube first outer diameter and the second body portion defines a second tube second outer diameter which is less than the second tube first outer diameter;
    wherein the second tube first outer diameter of the second member is equal to or less than the first tube first inner diameter of the first member, the second tube second outer diameter of the second member is equal to or less than the first tube first inner diameter of the first member, and wherein the second tube first outer diameter of the second member is greater than the first tube second inner diameter of the first member;
    wherein the second member is disposed within the first member with the first body portion of the first member disposed around the first body portion of the second member and the second body portion of the first member disposed around the second body portion of the second member;

wherein the first member is secured to the second member by at least a mechanical point of connection defined at the second body portions of the first and second members; and wherein the second tube first outer diameter defines a stop feature at a remote end of the second member, the stop feature being separate and distinct from the mechanical point of connection, wherein the stop feature is configured such that upon a disruption of the mechanical point of connection the second member will not completely separate from within the first member but still remain at least partially therein and operatively coupled together due to the second tube first outer diameter of the second member being greater than the first tube second inner diameter of the first member whereby the stop feature is not being capable of passing through the first tube second inner diameter of the first member.

11. The steering linkage of claim 10 wherein the first member and the second member are secured together by one of or a combination of two or more of swaging, staking, soldering, pinning and barbing.

12. The steering linkage of claim 10 wherein an outer clamp member is further provided and is disposed about the first member.

13. The steering linkage of claim 10 wherein the second tube second outer diameter of the second member includes at least one groove formed therein.

14. The steering linkage of claim 13 wherein the first member includes at least one barb provided therein which is configured to be disposed in the at least one groove of the second tube member.

15. The steering linkage of claim 13 wherein solder is disposed in the at least one groove and is configured to at least partially assist in the connection of the first member to the second member.

16. The steering linkage of claim 10 wherein the second member further includes a shoulder provided thereon, the shoulder being located outside of the first member and adjacent to an opened end thereof.

17. The steering linkage of claim 10 wherein the first member includes a double wall at the point of connection to the second member.

18. A method for producing a steering linkage adapted for use in a vehicle steering system comprising the steps of:
    providing a hollow tubular first member having a reduced diameter end;
    providing a tubular second member having a stepped body defining at least a first tube outer diameter and a second tube outer diameter which is less than the first tube outer diameter;
    disposing at least a portion of the second tube outer diameter of the second member within the reduced diameter end of the first member; and
    securing the first member and the second member together at the portion that the second tube outer diameter of the second member is disposed within the reduced diameter end of the first member by at least a mechanical type of connection;
    wherein the first outer tube diameter defines a stop feature at a remote end of the second member and the first tube outer diameter is greater than the reduced diameter end of the first member, wherein the stop feature is configured such that in the event the mechanical type of connection between the first member and the second member is disrupted, the stop feature is operative to prevent the first member and the second member from completely separating from each other by the stop feature not being capable of passing through the reduced diameter end of the first member so that at least the stop feature of the second member remains within the first member so as to operatively couple the first and second members together.

19. The method of claim 18 wherein the step of securing includes securing the first member and the second member together such that the connection is designed to disrupt at a predetermined load.

* * * * *